(12) United States Patent
Tabata et al.

(10) Patent No.: US 9,771,061 B2
(45) Date of Patent: Sep. 26, 2017

(54) CONTROL SYSTEM FOR VEHICLE

(71) Applicant: TOYOTA JIDOSHA KABUSHIKI KAISHA, Toyota-shi, Aichi-ken (JP)

(72) Inventors: Atsushi Tabata, Okazaki (JP); Haruhisa Suzuki, Nagoya (JP); Koichi Okuda, Toyota (JP); Hiroyuki Tateno, Nagoya (JP); Tatsuya Imamura, Okazaki (JP); Kota Fujii, Toyota (JP)

(73) Assignee: TOYOTA JIDOSHA KABUSHIKI KAISHA, Toyota (JP)

(*) Notice: Subject to any disclaimer, the term of this patent is extended or adjusted under 35 U.S.C. 154(b) by 19 days.

(21) Appl. No.: 14/947,175

(22) Filed: Nov. 20, 2015

(65) Prior Publication Data

US 2016/0152224 A1 Jun. 2, 2016

(30) Foreign Application Priority Data

Nov. 27, 2014 (JP) ................. 2014-240616

(51) Int. Cl.
| | | |
|---|---|---|
| *B60W 10/06* | (2006.01) | |
| *B60W 10/08* | (2006.01) | |
| *B60W 10/10* | (2012.01) | |
| *B60W 20/10* | (2016.01) | |
| *B60W 10/115* | (2012.01) | |
| *B60W 30/06* | (2006.01) | |
| *F02D 41/02* | (2006.01) | |

(52) U.S. Cl.
CPC ............ *B60W 20/10* (2013.01); *B60W 10/06* (2013.01); *B60W 10/08* (2013.01); *B60W 10/115* (2013.01); *B60W 30/06* (2013.01); *F02D 41/021* (2013.01); *B60W 2510/108* (2013.01); *B60W 2710/0677* (2013.01); *B60W 2710/083* (2013.01); *F02D 2250/26* (2013.01); *F02N 2200/106* (2013.01); *Y02T 10/6286* (2013.01); *Y10S 903/93* (2013.01)

(58) Field of Classification Search
None
See application file for complete search history.

(56) References Cited

U.S. PATENT DOCUMENTS

| | | | | |
|---|---|---|---|---|
| 2010/0076663 A1* | 3/2010 | Jinno | ............... | B60K 6/445 |
| | | | | 701/102 |
| 2010/0274414 A1* | 10/2010 | Park | ............... | B60W 30/06 |
| | | | | 701/2 |
| 2012/0143456 A1* | 6/2012 | Ueda | ............... | B60W 10/08 |
| | | | | 701/93 |
| 2014/0244073 A1* | 8/2014 | Okamura | ......... | B62D 15/0285 |
| | | | | 701/2 |

FOREIGN PATENT DOCUMENTS

| | | | |
|---|---|---|---|
| JP | 2001-001787 A | | 1/2001 |
| JP | 2012-126193 A | | 7/2012 |

* cited by examiner

*Primary Examiner* — Rami Khatib
(74) *Attorney, Agent, or Firm* — Oliff PLC

(57) ABSTRACT

A control system is for a vehicle that includes an internal combustion engine. The control system includes an electronic control unit. The electronic control unit is configured to limit an output of the internal combustion engine when the electronic control unit determines that the vehicle runs in an unmanned state, such that the output of the internal combustion engine is lower the vehicle runs in the unmanned state than when the vehicle runs in a manned state.

1 Claim, 11 Drawing Sheets

FIG.3

| | ENGAGEMENT DEVICE | | | | | |
|---|---|---|---|---|---|---|
| | C1 | C2 | B0 | B1 | B2 | F1 |
| 1st | ○ | | | | (○) | ○ |
| 2nd | ○ | | | ○ | | |
| 3rd | ○ | ○ | | | | |
| 4th | | ○ | | ○ | | |
| R | ○ | | | | ○ | |
| DOUBLE-DRIVING | | | ○ | | | |

CONTROL SYSTEM FOR VEHICLE

INCORPORATION BY REFERENCE

The disclosure of Japanese Patent Application No. 2014-240616 filed on Nov. 27, 2014 including the specification, drawings and abstract is incorporated herein by reference in its entirety.

BACKGROUND OF THE INVENTION

1. Field of the Invention

The present invention relates to a control system for a vehicle that can run in an unmanned state and in a manned state, and particularly to a technique to reduce a vehicle exterior noise caused due to an internal combustion engine during unmanned running.

2. Description of Related Art

There has been known a vehicle including an internal combustion engine and a vehicle control device that can perform unmanned running and manned running. In such a vehicle, a vehicle control device that performs an unmanned automatic operation instead of an operation by a driver is proposed. For example, a vehicle control device of Japanese Patent Application Publication No. 2012-126193 (JP 2012-126193 A) includes an internal combustion engine ECU that controls an output of an internal combustion engine of a vehicle, a steering ECU that controls a rotation direction and a rotation angle of steering of the vehicle, and a camera that takes images around the vehicle. In an automatic parking system provided outside the vehicle, a simulated accelerator lever operation and a simulated steering operation are performed based on images taken by the camera and wirelessly transmitted therefrom, as follows: based on information on a display that displays a vehicle image subjected to image processing and car-park images such as a parking space image and a parking vehicle image indicative of another vehicle that has been already parked in a parking space, the vehicle image on the display is parked in an empty parking space by an operator outside the vehicle. Based on automatic operation information formed by the simulated operation by the operator, a control on the internal combustion engine via the internal combustion engine ECU and a steering control via the steering ECU are performed by the vehicle control device, so that running to a parking space is performed by an unmanned automatic operation. Hereby, a burden of a driving operation of a driver at the time of parking is reduced.

In the meantime, the unmanned automatic operation described above may be performed in such a situation that the vehicle is moved from a garage in the early morning, for example. Further, a remote operation in which an unmanned vehicle is remote-controlled by an operation outside the vehicle from a control room or the like may be performed in such a situation that packages are conveyed or the vehicle is moved in a factory in the middle of the night. Such unmanned running in the early morning or in the middle of the night may have a problem with a vehicle exterior noise, which is a noise emitted outside the vehicle due to the internal combustion engine, for example.

SUMMARY OF THE INVENTION

The present invention has been achieved in view of the above circumstances as a background, and is to reduce a vehicle exterior noise due to an internal combustion engine during unmanned running.

A control system related to the present invention is for a vehicle. The vehicle includes an internal combustion engine. The control system includes an electronic control unit. The electronic control unit is configured to limit an output of the internal combustion engine when the electronic control unit determines that the vehicle runs in an unmanned state, such that the output of the internal combustion engine is lower the vehicle runs in the unmanned state than when the vehicle runs in a manned state.

According to the above control system, when it is determined that the vehicle runs in an unmanned state, the electronic control unit limits an output of the internal combustion engine in comparison with a case where the vehicle runs in a manned state. On this account, it is possible to reduce a vehicle exterior noise due to the internal combustion engine during unmanned running.

When the electronic control unit determines that the vehicle runs in the unmanned state, the electronic control unit may be configured to limit the output of the internal combustion engine, by controlling an output-shaft rotation speed of the internal combustion engine or a load of the internal combustion engine to be lower when the vehicle runs in the unmanned state than when the vehicle runs in the manned state.

The vehicle may include an electric motor as a drive source. When the electronic control unit determines that the vehicle runs in the unmanned state, the electronic control unit may be configured to limit the output of the internal combustion engine by limiting a driving force to a region in which the driving force is generated only by the electric motor.

The vehicle may include a transmission. When the electronic control unit determines that the vehicle runs in the unmanned state, the electronic control unit may be configured to limit gear shifting of the transmission.

The vehicle may include a transmission between the electric motor and an axle. When the electronic control unit determines that the vehicle runs in the unmanned state, the electronic control unit may be configured to decrease a torque of the electric motor as a hydraulic oil pressure of the transmission is smaller.

BRIEF DESCRIPTION OF THE DRAWINGS

Features, advantages, and technical and industrial significance of exemplary embodiments of the invention will be described below with reference to the accompanying drawings, in which like numerals denote like elements, and wherein:

FIG. 3 is a view to describe a relationship between a combination of operations of hydraulic frictional engagement devices provided in the driving device in FIG. 2 and a gear stage established by the combination;

DETAILED DESCRIPTION OF EMBODIMENTS

The following describes one embodiment of a hybrid control computer of the present invention with reference to the drawings.

Figure 1:
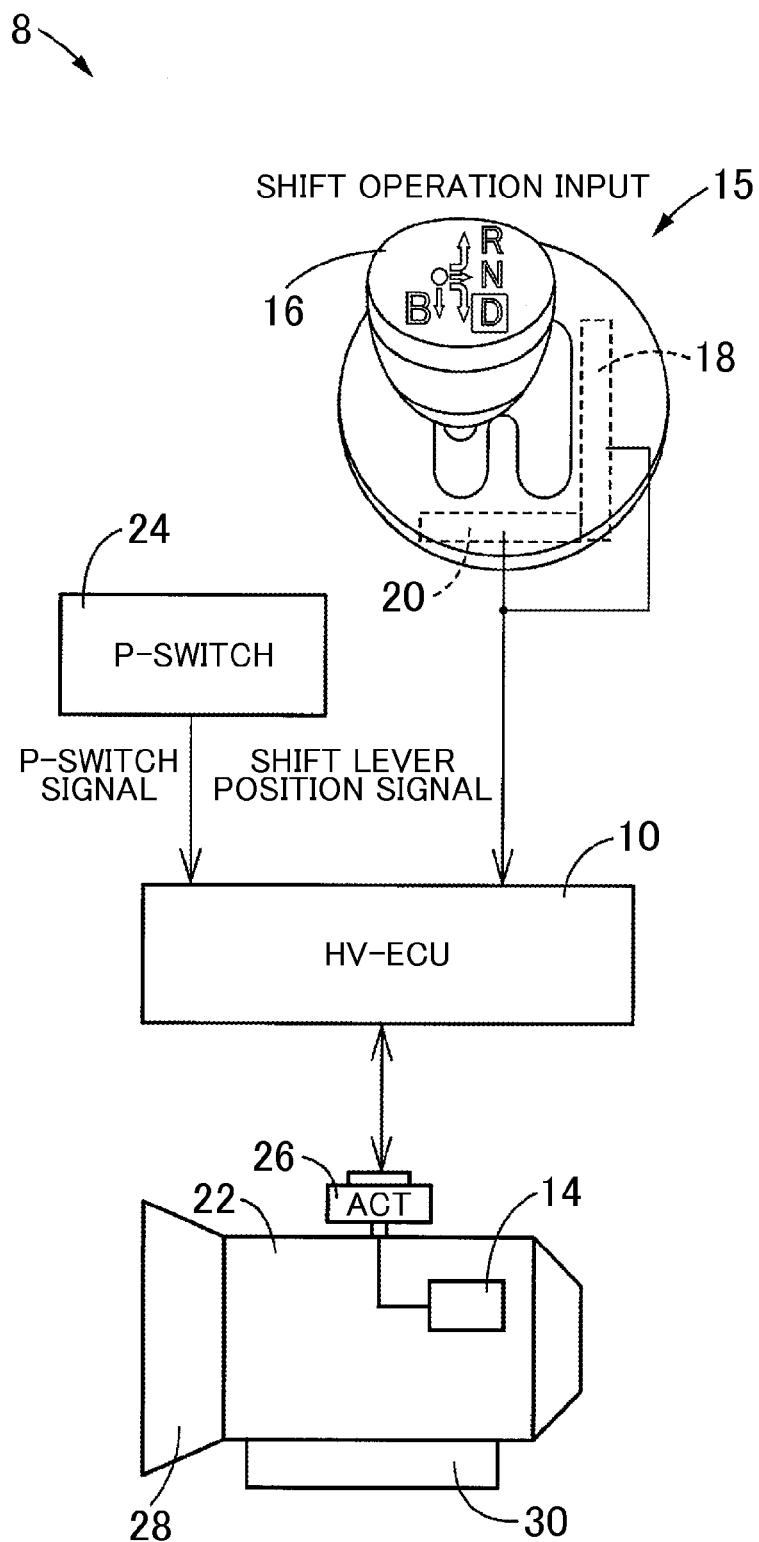
FIG. 1 is a view to describe a schematic configuration of a hybrid control computer.

FIG. 1 is a view to describe a schematic configuration of a hybrid control computer 10 (hereinafter referred to as "HV-ECU 10") provided in a hybrid vehicle 8 and having a function as an engine output restraining control device at the time of an unmanned operation. The HV-ECU 10 is configured to include a so-called microcomputer constituted by a CPU, a ROM, a RAM, an input-output interface, and so on, and controls an operation of a parking lock device 14 that locks a parking gear 12 (illustrated in FIG. 5) connected to drive wheels 79 by performing signal processing according to a program stored in the ROM in advance while using a temporary storing function of the RAM. The following signals are supplied to the HV-ECU 10: a shift lever position signal Psh according to a shift position from a shift sensor 18, which is a position sensor for detecting an operation position (a shift position) of a shift lever 16 of a shift operation device 15, and a select sensor 20; and a P-switch signal Psw indicative of a switching operation of a P-switch 24 for switching a shift range of a hybrid control driving device 22 (hereinafter referred to as the driving device 22) between a parking range (P-range) and a non-parking range (non-P-range) except for the parking range. In response to the shift lever position signal Psh supplied thereto, the HV-ECU 10 outputs a signal for controlling a rotation position of an electric actuator 26, so as to change the shift position of the driving device 22 by a so-called shift-by-wire system. When an input of the P-switch signal Psw is detected, the HV-ECU 10 performs parking lock by the parking lock device 14 via the electric actuator 26. Further, a P-position signal, which is a rotation signal of the electric actuator 26 and indicates an operating state of the parking lock, is supplied to the HV-ECU 10.

Further, the HV-ECU 10 performs a drive control such as a hybrid drive control of an engine 28 and a motor included in a driving device 22, a control of a hydraulic-pressure control circuit 30 for supplying hydraulic oil to a hydraulic frictional engagement device and the like included in the driving device 22, and the like control.

The vehicle 8 in which the operation and release of the parking lock and the switching of the shift range are performed by the shift-by-wire system preferably includes a camera for capturing images of a vehicle surrounding environment, and hereby, the vehicle 8 can perform an unmanned operation in an automatic operation of running to a destination or in a remote operation of running by a remote operation from outside the vehicle, while avoiding obstacles without requiring a driving operation by a driver.

Figure 2:
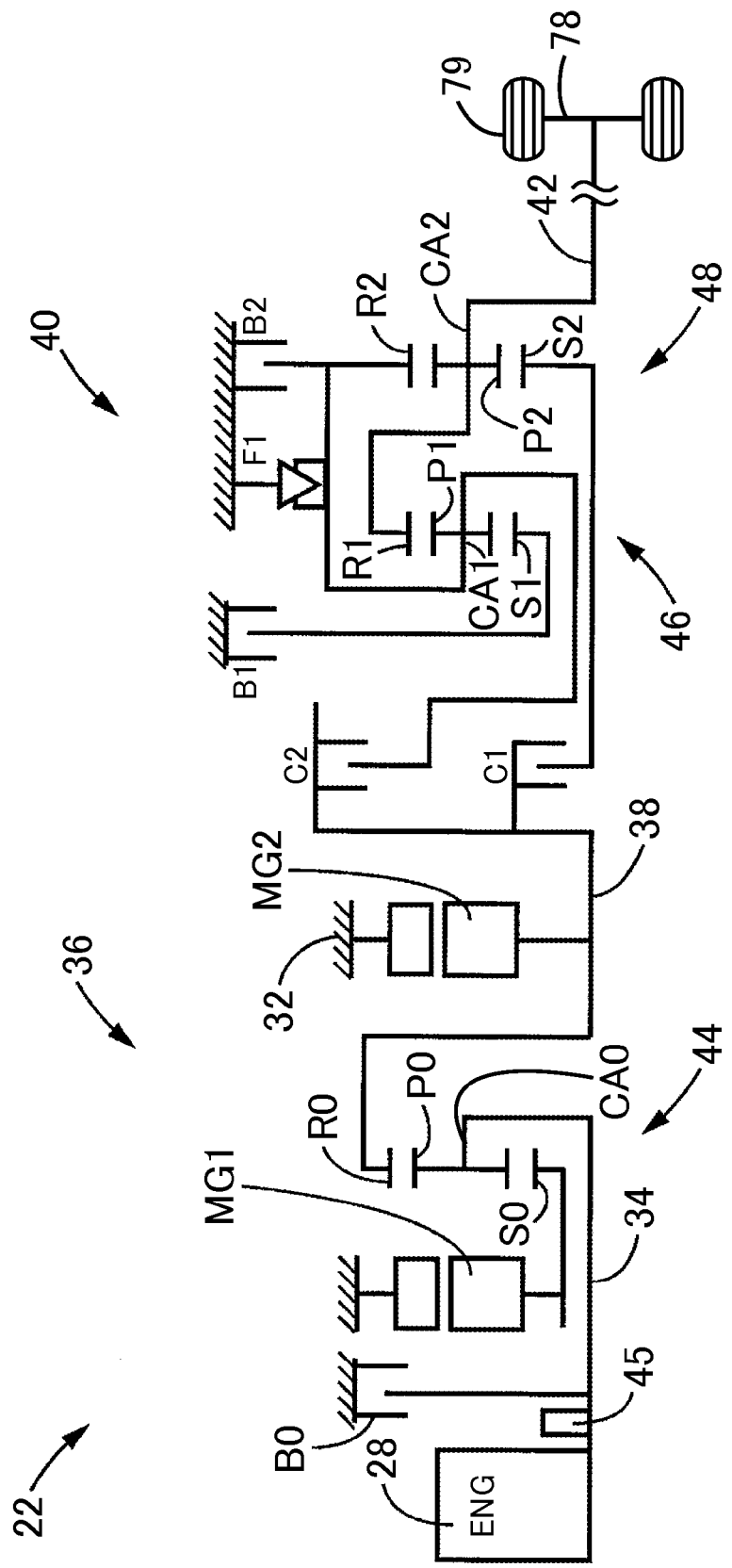
FIG. 2 is an outline view to describe an exemplary configuration of a hybrid-vehicle driving device provided in a hybrid vehicle to which the hybrid control computer of FIG. 1 is applied.

FIG. 2 is an outline view to describe a configuration of the hybrid-vehicle driving device 22 to which the HC-ECU 10 is applied preferably. As illustrated in FIG. 2, the driving device 22 of the present embodiment includes, in series, the following members disposed on a common axial center inside a transmission case 32 (hereinafter referred to as the case 32) serving as a nonrotatable member attached to a vehicle body: an input shaft 34; a differential portion 36 connected to the input shaft 34 directly or indirectly via a pulse absorbing damper (a vibration damping device) or the like (not shown); an automatic transmission portion 40 connected in series to a power transmission path between the differential portion 36 and the drive wheels 79 (not shown) via a transmission member (a driving shaft) 38; and an output shaft 42 connected to the automatic transmission portion 40.

The driving device 22 of the present embodiment is preferably used in a FR (front-engine, rear-drive) vehicle in which the driving device 22 is placed along a longitudinal direction of the vehicle, for example. The driving device 22 transmits a power generated by the engine 28, which is an internal combustion engine such as a gasoline engine or a diesel engine, for example, and serves as that driving source for running which is connected to the input shaft 34, from the output shaft 42 to the drive wheels 79 via a differential gear mechanism (not shown) and an axle 78 provided between the differential gear mechanism and the drive wheels 79 provided in pair. Note that, in the driving device 22 of the present embodiment, the engine 28 is directly connected to the differential portion 36. This direct connection indicates that they are connected to each other not via a fluid-type transmission device such as a torque converter or a fluid coupling, and this direct connection includes a connection via the pulse absorbing damper or the like, for example. Further, since the driving device 22 is configured symmetrically with respect to its axial center, so its lower side is omitted in the outline view of FIG. 2. The same can be said for each of the following embodiments.

The differential portion 36 includes: a first motor MG1; a power distribution device 44 which is a mechanical mechanism for mechanically distributing that output of the engine 28 which is input into the input shaft 34, and which serves as a differential mechanism for distributing the output of the engine 28 between the first motor MG1 and the transmission member 38; and a second motor MG2 operatively connected to the transmission member 38 so as to rotate integrally therewith. The first motor MG1 and the second motor MG2 provided in the driving device 22 of the present embodiment are each constituted by a three-phase alternating current synchronous motor including a stator around which a three-phase coil is wound and a rotator provided with a permanent magnet. The first motor MG1 and the second motor MG2 each function as a so-called motor generator functioning as a motor and a generator, and correspond to an electric motor of the present invention. With such a configuration, the differential portion 36 functions as an electric differential portion configured such that its operational state is controlled via the first motor MG1 and the second motor MG2, so that a differential state between an input rotation speed (a rotation speed of the input shaft 34) and an output rotation speed (a rotation speed of the transmission member 38) is controlled.

The power distribution device 44 is mainly constituted by a single-pinion planetary gear. The planetary gear includes, as rotating elements (elements), a sun gear S0, a planet gear P0, a carrier CA0 for supporting the planet gear P0 in a spinning and revolving manner, and a ring gear R0 meshing with the sun gear S0 via the planet gear P0. The carrier CA0 is connected to the input shaft 34, namely, the engine 28, the sun gear S0 is connected to the first motor MG1, and the ring gear R0 is connected to the transmission member 38. Further, the input shaft 34 to which the engine 28 is connected is selectively connected to the case 32, which is a nonrotatable member, via a brake B0. Further, a mechanical hydraulic pump 45 configured to be rotationally driven by the engine 28 so as to discharge hydraulic oil, and to stop supply of the hydraulic fluid to the hydraulic-pressure control circuit 30 when the engine 28 stops is connected to the input shaft 34.

The automatic transmission portion 40 is a planetary-gear type multistage transmission mainly constituted by single-pinion planetary gears 46, 48 in a power transmission path between the differential portion 36 and the drive wheels 79 and functioning as a stepped automatic transmission. The planetary gears 46, 48 each includes a sun gear S1, S2, a planet gear P1, P2, a carrier CA1, CA2 for supporting the planet gear P1, P2 in a spinning and revolving manner, and a ring gear R1, R2 meshing with the sun gear S1, S2 via the planet gear P1, P2.

Further, the automatic transmission portion 40 is configured such that the sun gear S1 is selectively connected to the case 32 via the brake B1. Further, the carrier CA1 and the ring gear R2 are connected integrally, so as to be selectively connected to the case 32 via a second brake B2, and a rotation in one direction relative to the case 32 is allowed via a one-way clutch F1 while a rotation in a reverse direction is prevented. Further, the sun gear S2 is selectively connected to the transmission member 38 via a first clutch C1. Further, the carrier CA1 and the ring gear R2 thus connected integrally are selectively connected to the transmission member 38 via a second clutch C2. Further, the ring gear R1 and the carrier CA2 are connected integrally, so as to be connected to the output shaft 42. Further, although not illustrated in FIG. 2, the parking gear 12 of the parking lock device 14 is connected to the output shaft 42 fixedly.

FIG. 3 is an engagement table to describe a combination of engaging operations of hydraulic frictional engagement devices to be used for each gear stage of the automatic transmission portion 40. As illustrated in FIG. 3, in the automatic transmission portion 40, a first gear stage is established by engagement between the first clutch C1 and the second brake B2. Note that, since a relative rotation of the carrier CA1 and the ring gear R2 relative to the case 32 is prevented by the one-way clutch F1, the first gear stage is established without the second brake B2 being engaged. Further, a second gear stage is established by engagement between the first clutch C1 and the first brake B1. Further, a third gear stage is established by engagement between the first clutch C1 and the second clutch C2. Further, a fourth gear stage is established by engagement between the second clutch C2 and the first brake B1. Further, a reverse gear stage (a reverse shift stage) is established by engagement between the first clutch C1 and the second brake B2. Further, when the first clutch C1, the second clutch C2, the first brake B1, and the second brake B2 are all released, for example, a neutral "N" state is established. Further, when the brake B0 is engaged, motor running in a state where the drive wheels 79 in pair can be driven by both the first motor MG1 and the second motor MG2, that is, in a double-driving state is achieved.

In the driving device 22 configured as described above, the differential portion 36 functioning as a continuously variable transmission and the automatic transmission portion 40 connected subsequently to the differential portion 36 constitute a continuously variable transmission as a whole. Further, by controlling a change gear ratio of the differential portion 36 to become constant, a state equivalent to a stepped transmission can be established by the differential portion 36 and the automatic transmission portion 40.

More specifically, when the differential portion 36 functions as a continuously variable transmission and the automatic transmission portion 40 connected in series to the differential portion 36 functions as a stepped transmission, a rotation speed (hereinafter referred to as an input rotation speed of the automatic transmission portion 40) that is input into the automatic transmission portion 40, that is, a rotation speed (hereinafter referred to as a transmission member rotation speed $N_{38}$) of the transmission member 38 is changed in a stepless manner with respect to at least one gear stage M of the automatic transmission portion 40, so that a stepless change gear ratio width can be obtained at the gear stage M. Accordingly, a general change gear ratio $\gamma T$ of the driving device 22 (=a rotation speed Nin of the input shaft 34/a rotation speed Nout of the output shaft 42) can be obtained continuously, so that a continuously variable transmission is established in the driving device 22. The general change gear ratio $\gamma T$ of the driving device 22 is a total change gear ratio $\gamma T$, as the whole driving device 22, which is formed based on a change gear ratio $\gamma 0$ of the differential portion 36 and a change gear ratio $\gamma$ of the automatic transmission portion 40.

Figure 4:
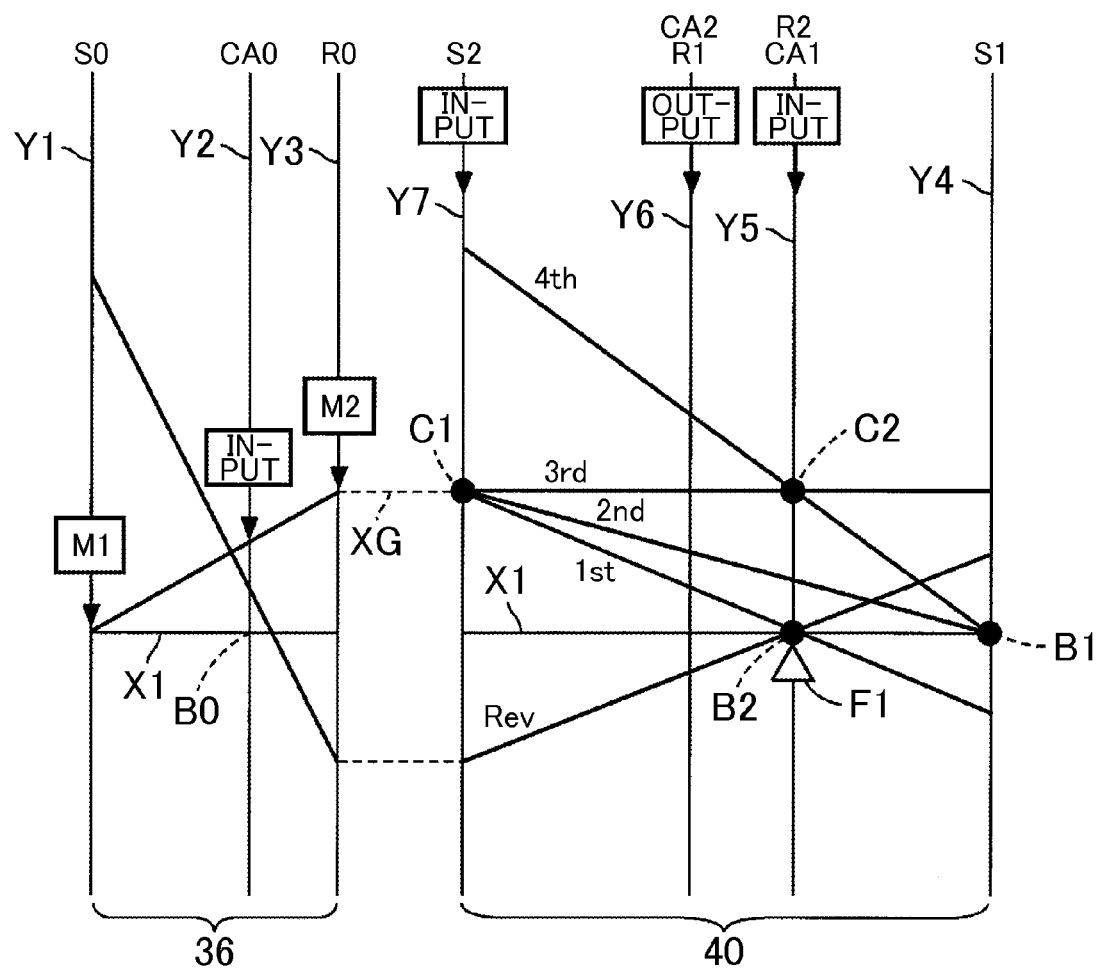
FIG. 4 is a collinear diagram that can show, on a straight line, a relative relationship among rotation speeds of rotating elements connected in a different state for each gear stage, in terms of a differential portion and an automatic transmission portion in the driving device of FIG. 2.

FIG. 4 is a collinear diagram showing, on a straight line, a relative relationship among rotation speeds of rotating elements connected in a different state for each gear stage, in terms of the differential portion 36 and the automatic transmission portion 40 in the driving device 22. The collinear diagram of FIG. 4 is two-dimensional coordinates constituted by a horizontal axis indicative of a relationship among gear ratios ρ of respective planetary gears 44, 46, 48, and a vertical axis indicative of a relative rotation speed. A horizontal line X1 indicates a rotation speed 0 and a horizontal line XG indicates a rotation speed $N_{38}$ of the transmission member 38.

Further, three vertical lines Y1, Y2, Y3 corresponding to three elements of the power distribution device 44 constituting the differential portion 36 indicate relative rotation speeds of the sun gear S0, the carrier CA0, and the ring gear R0, sequentially from the left side, and intervals therebetween are determined according to a gear ratio of the planetary gear constituting the power distribution device 44. Further, four vertical lines Y4, Y5, Y6, Y7 of the automatic transmission portion 40 are as follows: sequentially from the right side, Y4 indicates a relative rotation speed of the sun gear S1, Y5 indicates a relative rotation speed of the carrier CA1 and the ring gear R2 connected to each other, Y6 indicates a relative rotation speed of the ring gear R1 and the carrier CA2 connected to each other, and Y7 indicates a relative rotation speed of the sun gear S2. Intervals between the vertical lines Y4 to Y7 are determined according to gear ratios of the planetary gears 46, 48.

Next will be described a configuration of the parking lock device 14 that performs parking lock on the drive wheels 79 via the parking gear 12 fixed to the output shaft 42 in detail with reference to FIG. 5. The parking lock device 14 includes: the parking gear 12 fixed to the output shaft 42 operatively connected to the drive wheels 79 (not shown); a parking lock pole 50 provided pivotably to a meshing position where the parking lock pole 50 meshes with the parking gear 12, so as to selectively lock a rotation of the parking gear 12; a parking rod 54 inserted into a tapered portion 52 abutting with the parking lock pole 50 so as to support the tapered portion 52 at one end; a spring 56 provided in the parking rod 54 so as to bias the tapered portion 52 toward its small-diameter direction; a detent plate 58 pivotably connected to the other end part of the parking rod 54 and positioned by a detent mechanism to at least a parking position; a shaft 60 secured to the detent plate 58 and supported rotatably around one axis; an electric actuator 26 for rotationally driving the shaft 60; a rotary encoder 62 for detecting a rotation angle of the shaft 60; a detent spring 64 for giving moderation to a rotation of the detent plate 58 so as to fix the detent plate 58 to each shift position; and an engaging roller 66 provided in a tip end of the detent spring 64.

The detent plate 58 is operatively connected to a driving shaft of the electric actuator 26 via the shaft 60, and is driven by the electric actuator 26 together with the parking rod 54, so as to function as a shift positioning member for changing a shift position of the driving device 22. A first recessed portion 68 and a second recessed portion 70 are formed in a top portion of the detent plate 58. The first recessed portion 68 corresponds to a parking lock position, and the second recessed portion 70 corresponds to a non-parking lock position. Further, the rotary encoder 62 outputs a pulse signal to acquire a driving amount of the electric actuator 26, that is, a discrete value (an encoder count) according to a rotational amount.

Figure 5:
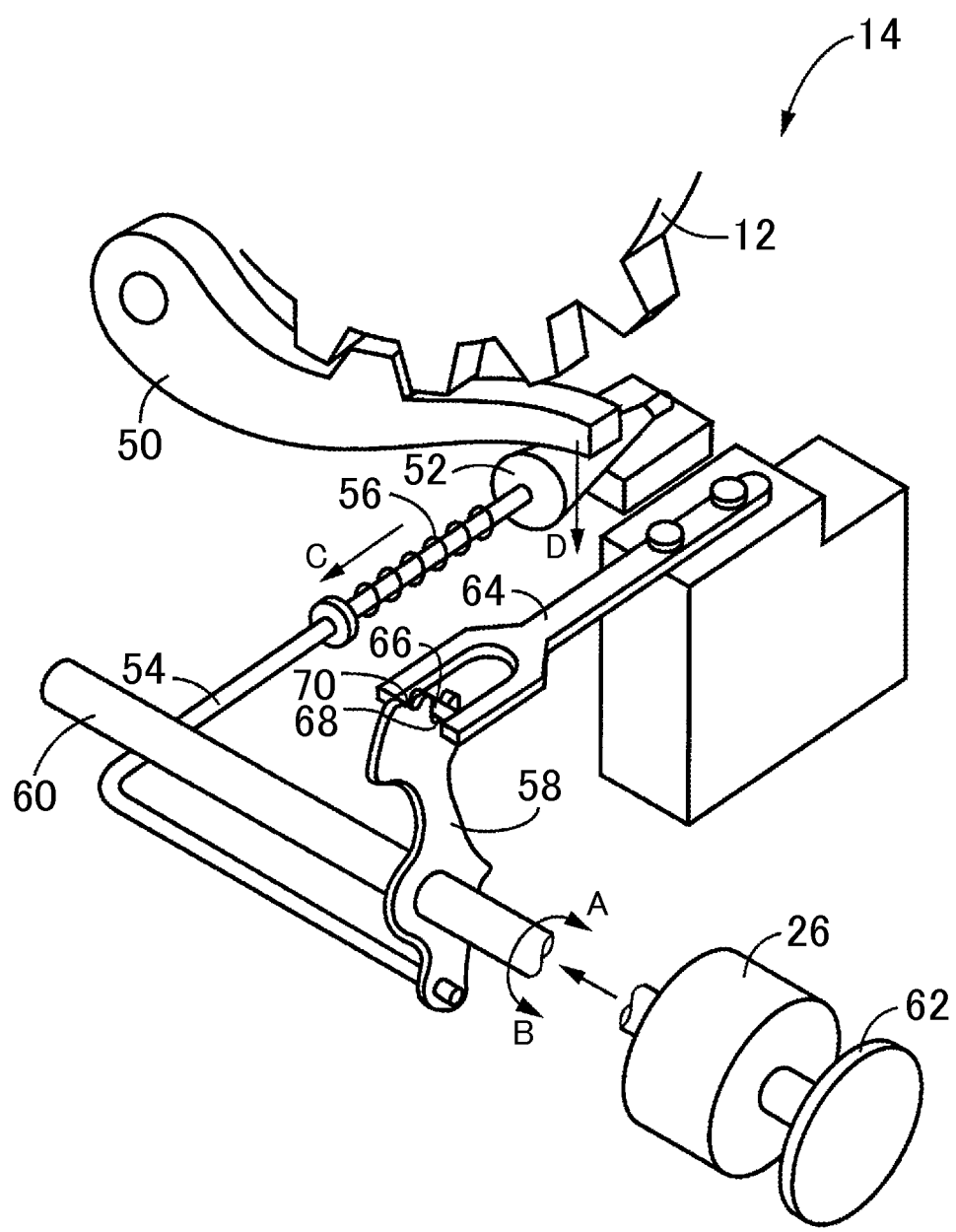
FIG. 5 is a view to describe details of a configuration of a parking lock device in FIG. 1.

FIG. 5 illustrates a case where the parking lock device 14 is in a parking lock state. When the parking lock device 14 is in a parking lock state, the parking lock pole 50 is meshed with the parking gear 12, so as to prevent a rotation of the parking gear 12. Note that, since the parking gear 12 is operatively connected to the drive wheels 79 (not shown), when the parking gear 12 is in a lock state, a rotation of the drive wheels 79 is also prevented. When an abutment position of the parking lock pole 50 with the tapered portion 52 provided in one end of the parking rod 54 is changed, a position of the parking lock pole 50 is adjusted. For example, in a case where the parking lock pole 50 abuts with a large diameter part of the tapered portion 52, the parking gear 12 is meshed with the parking lock pole 50, so that a parking lock state is established (FIG. 5). In the meantime, in a case where the parking lock pole 50 abuts with a small diameter part of the tapered portion 52, the parking lock pole 50 is disengaged from the parking gear 12, so that the parking lock state is released.

The abutment position of the parking lock pole 50 with the tapered portion 52 is adjusted based on an axial position of the tapered portion 52. The axial position of the tapered portion 52 is changed by the parking rod 54, and along with that, the abutment position of the parking lock pole 50 with the tapered portion 52 is adjusted. For example, when the tapered portion 52 is moved in an arrow-C direction, the parking lock pole 50 abuts with a small diameter side of the tapered portion 52. Accordingly, as a tip of the parking lock pole 50 is moved toward a vertically lower side (in an arrow-D direction), the parking lock pole 50 is disengaged from the parking gear 12. That is, the parking lock state is released.

In the meantime, when the tapered portion 52 is moved in a reverse direction to the arrow C, the tip of the parking lock pole 50 abuts with a large diameter side of the tapered portion 52. Accordingly, as the tip of the parking lock pole 50 is moved toward a vertically upper side, which is a reverse direction to the arrow D, the parking lock pole 50 is meshed with the parking gear 12. That is, the parking lock state is established.

Further, an axial movement of the parking rod 54 is adjusted according to a pivoting position of the detent plate 58, that is, a rotation position of the shaft 60. The shaft 60 is rotated by the electric actuator 26, and its rotation position is controlled based on that driving signal of the electric actuator 26 which is output from the HV-ECU 10 that controls a running range. Here, in the shaft 60, a rotation position at which the first recessed portion 68 of the detent plate 58 is engaged with the engaging roller 66 of the detent spring 64 corresponds to a parking lock position, that is, a position where the parking gear 12 is meshed with the parking lock pole 50. In the meantime, a rotation position at which the second recessed portion 70 of the detent plate 58 is engaged with the engaging roller 66 corresponds to a parking-lock release position, that is, a position where the parking gear 12 is disengaged from the parking lock pole 50. Accordingly, when a parking-lock instruction signal is output from the HV-ECU 10, the electric actuator 26 rotates the shaft 60 in an arrow-B direction to the rotation position at which the first recessed portion 68 is engaged with the engaging roller 66. Further, when a parking-lock release instruction signal is output from the HV-ECU 10, the electric actuator 26 rotates the shaft 60 in an arrow-A direction to the rotation position at which the second recessed portion 70 is engaged with the engaging roller 66. Note that the rotation position of the shaft 60 is controlled so that a discrete value detected by the rotary encoder 62 based on a reference rotation position set in advance becomes discrete values corresponding to rotation positions set in advance for the parking lock position and the parking-lock release position.

Figure 6:
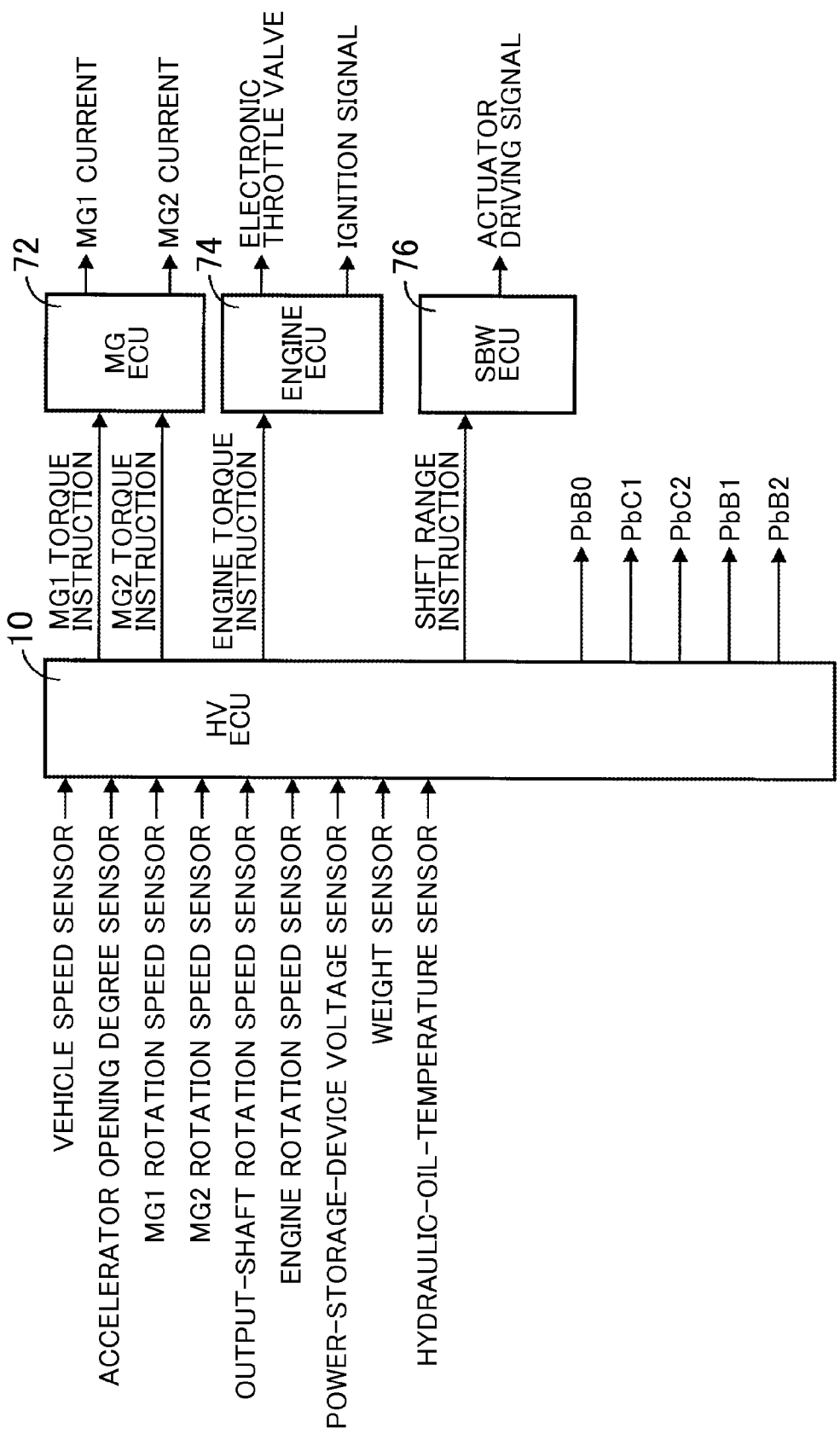
FIG. 6 is a view to describe input/output signals of the hybrid control computer in FIG. 1.

FIG. 6 is a view to describe input/output signals of the HV-ECU 10. In addition to the shift lever position signal Psh, the P-switch signal Psw, and the like, the following signals are supplied to the HV-ECU 10, for example: a signal indicative of an accelerator opening degree Acc (%), which is an operation amount of an accelerator pedal as a requirement (a driver requirement) to the vehicle 8 from a driver and which is detected by an accelerator opening degree sensor; a signal indicative of an engine rotation speed Ne (rpm), which is a rotation speed of the engine 28 and which is detected by an engine rotation speed sensor; a signal indicative of an intake-air amount Q of the engine 28, which is detected by an intake-air amount sensor; a signal indicative of an throttle opening degree θth (%), which is an opening degree of an electronic throttle valve and which is detected by a throttle position sensor; a signal indicative of a vehicle speed V, which is detected by a vehicle speed sensor; a signal indicative of an output-shaft rotation speed Nout, which is a rotation speed of the output shaft 42 and which is detected by an output-shaft rotation speed sensor; a signal indicative of a first-motor rotation speed $N_{MG1}$ and its rotation direction, which are detected by a first-motor rotation speed sensor; a signal indicative of a second-motor rotation speed $N_{MG2}$ and its rotation direction, which are detected by a second-motor rotation speed sensor; a signal indicative of a remaining charge amount (SOC) of the power storage device 43, which is determined based on that voltage of the power storage device 43 which is detected by a power-storage-device voltage sensor; a signal indicative of whether or not a driver sits on a driver seat, which is detected by a weight sensor provided in the driver seat; a signal indicative of a hydraulic oil temperature $TH_{OIL}$, which is a temperature of hydraulic oil (e.g., well-known ATF) in the hydraulic-pressure control circuit 30 and which is detected by a hydraulic-oil-temperature sensor; a signal indicative of a rotation speed $N_{38}$ of the transmission member 38, which is detected by a transmission-member rotation speed sensor; a signal indicative of an ISC valve opening degree θisc, which is detected by an ISC valve opening degree sensor; and the like signals.

Further, the HV-ECU 10 supplies the following signals: an MG1 torque instruction signal for controlling an output torque of the first motor MG1 and an MG2 torque instruction signal for controlling an output torque of the second motor MG2, which are supplied to a motor control computer 72 (MG-ECU 72) for controlling a current amount of the first motor MG1 and a current amount of the second motor MG2; an engine output torque instruction signal, which is supplied to an engine control computer 74 (an engine ECU 74) for controlling, via a throttle actuator, a throttle opening degree θth of the electronic throttle valve provided in an inlet pipe of the engine 28, for example, and for controlling an ignition timing of the engine 28 via an ignition device; a shift position change instruction signal, which is supplied to a shift-by-wire control computer 76 (SBW-ECU 76) for electrically changing a running position of the vehicle 8 via the electric actuator 26, for example, based on the shift lever position signal Psh; a hydraulic-pressure instruction signal for controlling an output pressure of each electromagnetic control valve included in the hydraulic-pressure control circuit 30 for controlling hydraulic actuators of the hydraulic frictional engagement devices provided in the driving device 22; and the like signals.

The hydraulic-pressure control circuit 30 includes linear solenoid valves SL1 to SL5 for controlling operations of hydraulic actuators ACT1 to ACT5 that supply respective hydraulic oil pressures to the first clutch C1, the second clutch C2, the first brake B1, the second brake B2, and the brake B0. By taking, as source pressures, respective hydraulic pressures generated from the mechanical hydraulic pump 45 and/or an electric hydraulic pump 80 that are rotationally driven by the engine 28, a line hydraulic pressure that is regulated by a relief-type pressure regulating valve, for example, is regulated, by linear solenoid valves SL1 to SL5, to a C1 clutch pressure $P_{C1}$, a C2 clutch pressure $P_{C2}$, a B1 brake pressure $P_{B1}$, a B2 brake pressure $P_{B2}$, and a B0 brake pressure $P_{B0}$, which are engagement hydraulic pressures (clutch pressures, brake pressures) according to the hydraulic-pressure instruction signal from the HV-ECU 10), and supplied directly to their corresponding portions.

In the meantime, in order to reduce a vehicle exterior noise due to the engine 28 at the time of unmanned running in an automatic operation or a remote operation, the HV-ECU 10 performs an engine output restraining control.

Figure 7:
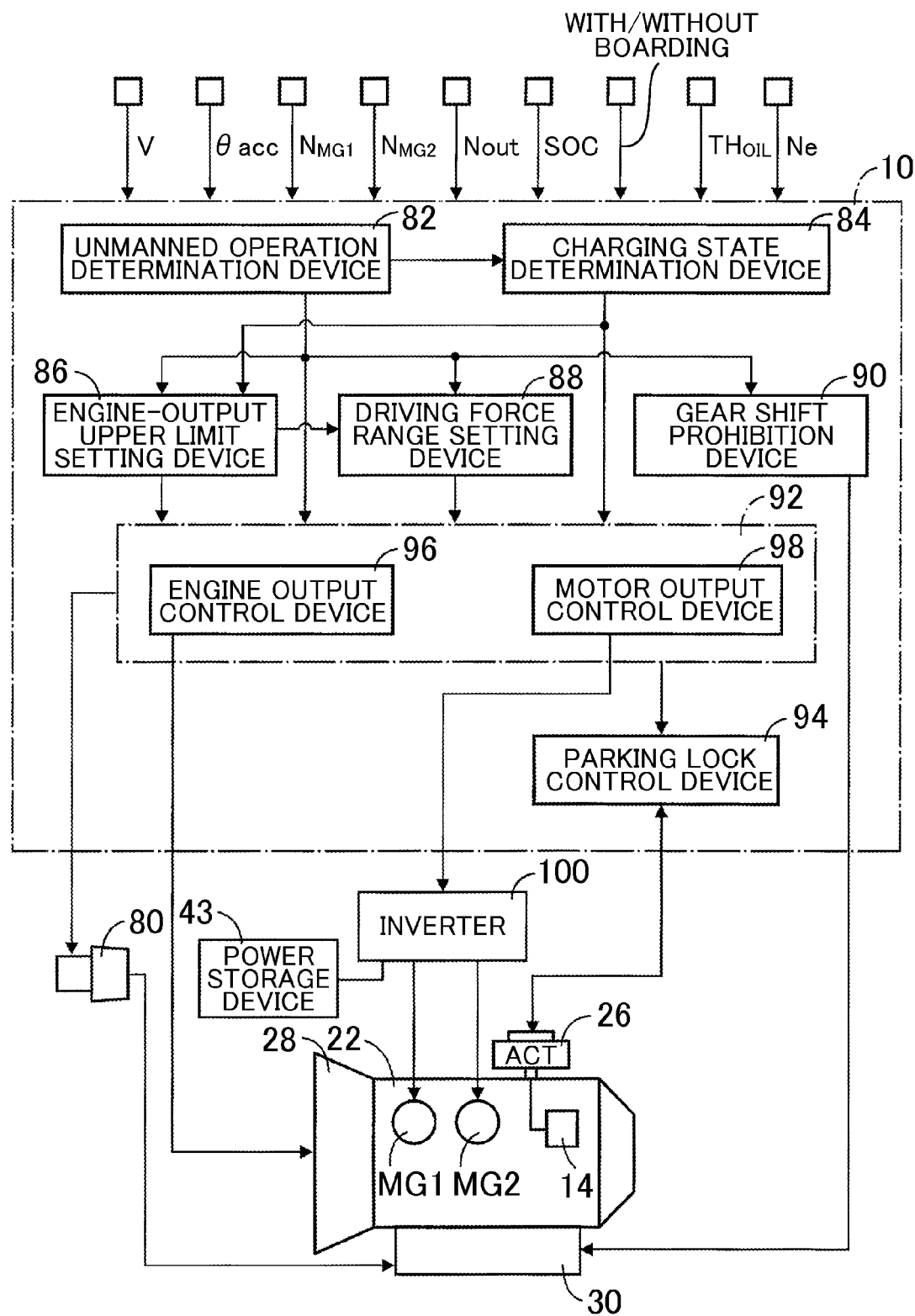
FIG. 7 is a functional block diagram to describe an essential part of a control function provided in the hybrid control computer in FIG. 1.

FIG. 7 is a functional block diagram to describe an essential part of a control function of the HV-ECU 10. The HV-ECU 10 includes an unmanned operation determination device 82, a charging state determination device 84, an engine-output upper limit setting device 86, a driving force range setting device 88, a gear shift prohibition device 90, a hybrid control device 92, and a parking lock control device 94. Further, the hybrid control device 92 is constituted by an engine output control device 96, and a motor output control device 98.

On condition that an automatic operation or a remote operation is selected, the unmanned operation determination device 82 determines, based on a signal detected sequentially by the weight sensor provided in the seat, whether the automatic operation or the remote operation is an unmanned operation or not.

When it is determined, by the unmanned operation determination device 82, that unmanned running is performed in the automatic operation or the remote operation, the charging state determination device 84 determines whether that remaining charge amount (SOC) (%) of the power storage device 43 which is detected sequentially by the power-storage-device voltage sensor is larger than a predetermined first remaining charge amount $C_1$(%) or not. Here, the predetermined first remaining charge amount $C_1$ is a threshold that determines whether or not driving forces of the first motor MG1 and the second motor MG2 are stably output for a given time even if an engine output restraining control is performed so as reduce an engine output.

Figure 8:
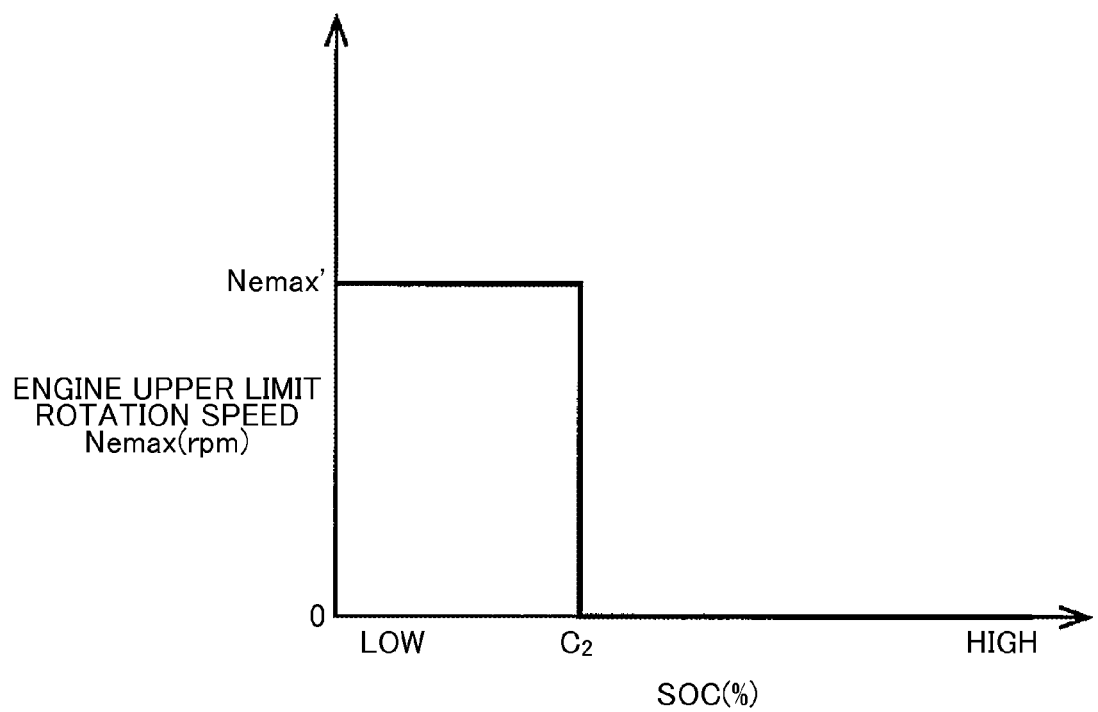
FIG. 8 is a view illustrating a relationship between a charging state of a power storage device and an engine upper limit rotation speed, which is an upper limit of an engine rotation speed at the time of an engine output restraining control performed by the hybrid control computer of FIG. 1.

When the engine-output upper limit setting device 86 obtains, from the unmanned operation determination device 82, a signal indicative of the unmanned operation being performed in the automatic operation or in the remote operation, the engine-output upper limit setting device 86 sets an engine-output upper limit that limits an output of the engine 28, based on that charging state of the power storage device 43 which is determined by the charging state determination device 84. FIG. 8 is a graph showing a relationship between that upper limit Nemax of an engine rotation speed Ne which is used for the engine output restraining control and the remaining charge amount (SOC) of the power storage device 43. When the remaining charge amount is larger than a predetermined second remaining charge amount $C_2$(%), the engine-output upper limit setting device 86 sets an engine upper limit rotation speed Nemax, which is an upper limit of the engine rotation speed Ne in the engine output restraining control, to zero, and when the remaining charge amount is not more than the predetermined second remaining charge amount $C_2$(%), the engine-output upper limit setting device 86 sets the engine upper limit rotation speed Nemax in the engine output restraining control to a predetermined engine rotation speed Nemax'. Here, the second remaining charge amount $C_2$ is that lower limit of the remaining charge amount of the power storage device 43 which is experimentally set in advance so that so-called motor running in which running is stably performed by the second motor MG2 and the first motor MG1 for a predetermined time due to driving forces from only the motors even if the engine rotation speed Ne is set to zero so as to stop the engine 28. The second remaining charge amount $C_2$ is a value larger than the first remaining charge amount $C_1$. Further, the predetermined engine rotation speed Nemax' is set in the following case: a vehicle exterior noise can be reduced as compared with an operation with a setting that is performed at the time of a manned operation in which the engine 28 is operated so that fuel efficiency of the engine 28 is maximum without restraining an engine output, and the remaining charge amount is larger than the first remaining charge amount $C_1$ but not more than the second remaining charge amount $C_2$.

When it is determined, by the unmanned operation determination device 82, that an unmanned operation state is established in the automatic operation or the remote operation, the driving force range setting device 88 sets a driving force range output from the second motor MG2 and the first motor MG1. The driving force range setting device 88 calculates a transmission torque capacity caused according to a hydraulic oil pressure supplied to the hydraulic actuator of the clutch C1 that establishes a first gear of the automatic transmission portion 40, based on the engine upper limit rotation speed Nemax set by the engine-output upper limit setting device 86 and a hydraulic oil temperature $TH_{OIL}$ detected by the hydraulic-oil-temperature sensor. A range of a driving force Fcmg output from the first motor MG1 and the second motor MG2 is set so as to prevent such a situation that an automatic transmission portion input torque $T_{IN}$, which is transmitted from the differential portion 36 to the automatic transmission portion 40, exceeds the calculated transmission torque capacity of the clutch C1 and causes slipping in the clutch C1. Here, a driving force corresponding to the automatic transmission portion input torque $T_{IN}$ is limited so as to fall within a range where the driving force does not exceed the transmission torque capacity and within a range of a maximal driving force that can be generated only by the first motor MG1 and the second motor MG2. As such, the engine rotation speed Ne is reduced as compared to the manned operation in which the engine output is not restrained, so that an increase in the hydraulic oil temperature $TH_{OIL}$ is restrained. Hereby, the driving force range setting device 88 reduces an output torque of the first motor MG1 and the second motor MG2 along with an decrease in that hydraulic oil pressure applied to the hydraulic actuator for operating the clutch C1 of the automatic transmission portion 40, so as not to exceed the transmission torque capacity of each clutch and each brake in the automatic transmission portion 40. Hydraulic oil pressure applied to the hydraulic actuator is supplied from the mechanical hydraulic pump 45 and/or the electric hydraulic pump 80.

When it is determined, by the unmanned operation determination device 82, that the unmanned operation is performed in the automatic operation or the remote operation, the gear shift prohibition device 90 sets a gear stage of the automatic transmission portion 40 during forward running to any one of the first to fourth gears, and then prohibits gear shifting to another gear stage from the gear stage thus set, during the engine output restraining control. More specifically, the gear shift prohibition device 90 outputs, to the hydraulic-pressure control circuit 30, a hydraulic pressure instruction value that causes the hydraulic frictional engagement devices except the brake B0 to be engaged and/or disengaged according to the engagement table shown in FIG. 3, so as to establish any one of the first to fourth gears. Hereby, the gear shift prohibition device 90 supplies engaging pressures to respective hydraulic actuators of the automatic transmission portion 40 so as to engage the hydraulic frictional engagement devices, and maintains the engaging pressures to the respective hydraulic actuators so as to establish at least the gear stage thus set, during the engine output restraining control.

When it is determined, by the unmanned operation determination device 82, that the unmanned operation is performed in the automatic operation or the remote operation and it is determined, by the charging state determination device 84, that the charging state of the power storage device 43 is larger than the first remaining charge amount $C_1$, the hybrid control device 92 operates the electric hydraulic pump 80 so as to secure an engagement pressure supplied to a frictional engagement device that establishes a predetermined gear stage of the automatic transmission portion 40 to perform power transmission during the engine output restraining control. Further, the hybrid control device 92 turns on an ignition, so as to operate an electrical system provided in the vehicle 8.

Upon receipt of the signal indicative of the unmanned operation being performed in the automatic operation or the remote operation via the hybrid control device 92, the parking lock control device 94 drives the electric actuator 26 so as to release parking lock of the parking lock device 14.

Figure 9:
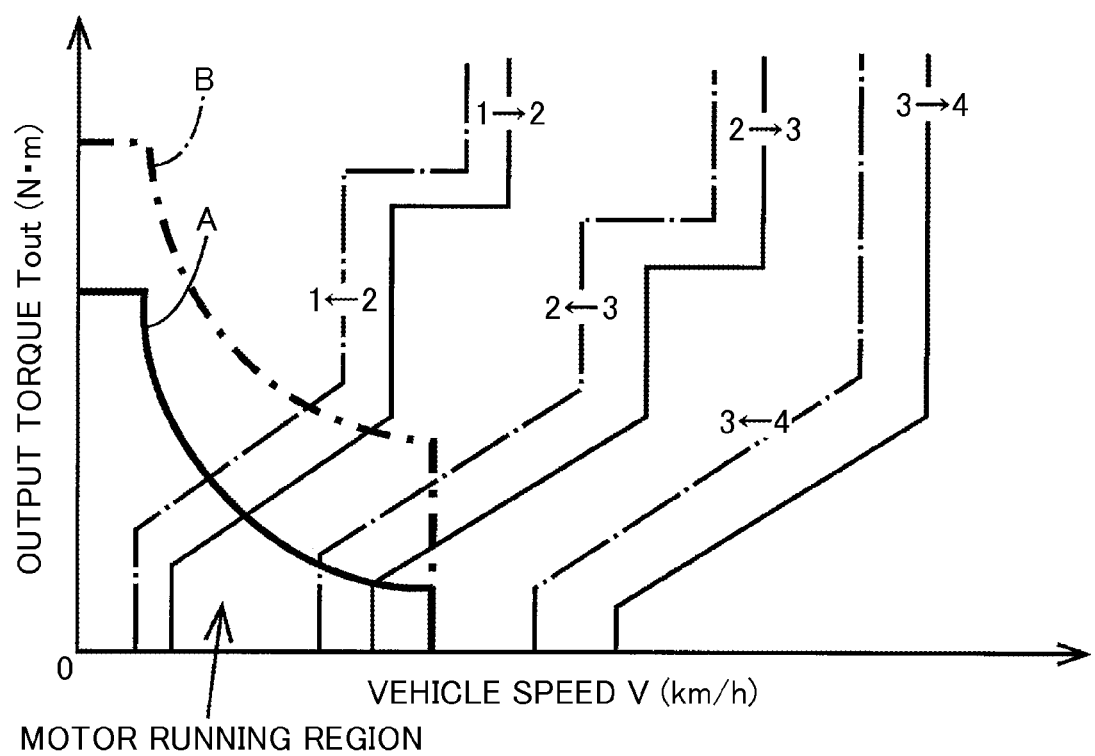
FIG. 9 is a view illustrating an example of a speed change diagram formed in two-dimensional coordinates with a vehicle speed and an output torque being taken as parameters and stored in advance so as to be used for determination of gear shifting in the automatic transmission portion, and an example of a driving force switch diagram stored in advance, having a boundary line between an engine running region and a motor running region, and used to switch between engine running and motor running, in the driving device in FIG. 2.

Further, when it is determined, by the unmanned operation determination device 82, that not the unmanned operation but the manned operation is performed, or when the unmanned operation is performed, but it is determined, by the charging state determination device 84, that the charging state of the power storage device 43 is not more than the first remaining charge amount $C_1$, the hybrid control device 92 operates the engine 28, the first motor MG1, and the second motor MG2 with that setting for the manned running in which the change gear ratio of the automatic transmission portion 40 is controlled so that the engine rotation speed Ne becomes a fuel-efficiency optimal value. A continuous line A of FIG. 9 is a boundary line between an engine running region and a motor running region, namely, a driving force source switching locus for changing a driving force source for start/running (hereinafter referred to as "for running") of the vehicle 8 between the engine 28 and the motor, e.g., the second motor MG2, in other words, for changing between so-called engine running, which is manned running in which the vehicle 8 is caused to start/run (hereinafter referred to as "run") with the engine 28 being used as the driving force source for running, and so-called motor running, which is motor running in which the vehicle 8 is caused to run with the second motor MG2 being used as the driving force source for running. The hybrid control device 92 determines whether the vehicle 8 is in the motor running region or in the engine running region, based on a vehicle state presented by a vehicle speed V and a requested output torque Tout of the automatic transmission portion 40, and performs motor running or engine running Note that the engine running includes torque assist running in which electrical energy from the first motor MG1 and/or electrical energy from the power storage device 43 are/is supplied to the second motor MG2, so as to drive the second motor MG2 to assist power of the engine 28.

Further, when it is determined, by the unmanned operation determination device 82, that not the unmanned operation but the manned operation is performed, or when the unmanned operation is performed, but it is determined, by the charging state determination device 84, that the charging state of the power storage device 43 is not more than the first remaining charge amount $C_1$, the hybrid control device 92 determines a gear stage to be established in the automatic transmission portion 40, based on a vehicle state presented by the vehicle speed V and the requested output torque Tout of the automatic transmission portion 40 from relationships (a gear shift diagram, a gear shift map) indicated by a continuous line and an alternate long and short dash line in FIG. 9, and the hybrid control device 92 performs gear shifting in the automatic transmission portion 40 so that the gear stage thus determined is established.

On the other hand, when it is determined, by the unmanned operation determination device 82, that the unmanned operation is performed in the automatic operation or the remote operation, and it is determined, by the charging state determination device 84, that the charging state is larger than the first remaining charge amount $C_1$, the hybrid control device 92 performs output controls on the engine 28, the first motor MG1, and the second motor MG2 so that an engine output is restrained as compared with the setting in the manned traveling.

That is, when the unmanned operation is performed and the charging state of the power storage device 43 is larger than the first remaining charge amount $C_1$ but not more than the second remaining charge amount $C_2$, the engine output control device 96 of the hybrid control device 92 restrains an output of the engine 28 via the engine ECU 74 so as to achieve an engine rotation speed Ne within a range that does not exceed the engine upper limit rotation speed Nemax' set by the engine-output upper limit setting device 86, e.g., an idle rotation speed Neidl, which is a minimum engine rotation speed Ne to continually operate the engine 28. Further, when the charging state of the power storage device 43 is larger than the predetermined second remaining charge amount $C_2$, the engine output control device 96 stops the engine 28 by fuel cut that stops fuel supply with a fuel injection device via the engine ECU 74 so that the engine rotation speed Ne becomes zero.

Further, when it is determined, by the unmanned operation determination device 82, that the unmanned operation is performed in the automatic operation or the remote operation, and it is determined, by the charging state determination device 84, that the charging state is larger than the first remaining charge amount $C_1$, the motor output control device 98 of the hybrid control device 92 outputs a control signal to restrain an output torque of the first motor MG1 and the second motor MG2, to the MG-ECU 72 via the inverter 100, so as to achieve a driving force within a range that does not exceed that driving force Fcmg output from the second motor MG2 and the first motor MG1 which is set by the driving force range setting device 88.

Further, when it is determined, by the unmanned operation determination device 82, that the unmanned operation is performed in the automatic operation or the remote operation, and it is determined, by the charging state determination device 84, that the charging state is larger than the second remaining charge amount $C_2$, the engine 28 is stopped, so it is not necessary to secure a starting torque to increase an rotation speed of the first motor MG1 that increases, to a self-sustaining rotation speed, the engine rotation speed Ne at the time when motor running is switched to engine running. Accordingly, the hybrid control device 92 performs motor running according to a driving force source switching locus indicated by an alternate long and short dash line B in which a motor running region is enlarged as compared with a driving force source switching locus A in FIG. 9.

Figure 10:
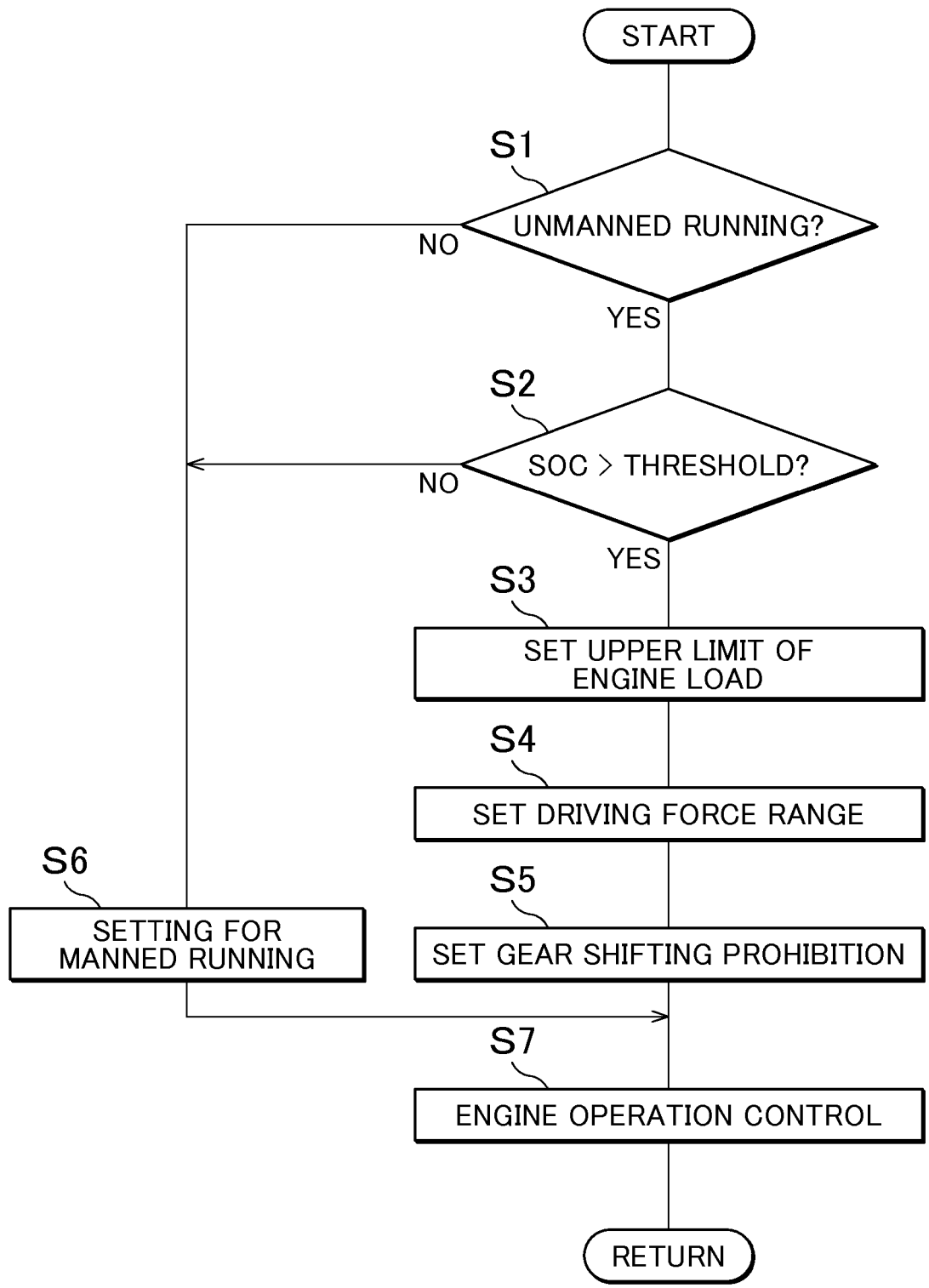
FIG. 10 is a flowchart to describe a control operation of an engine output restraining control to be performed at the time of an unmanned operation in an automatic operation, which is an essential part of a control operation of the hybrid control computer in FIG. 1.
Figure 11:
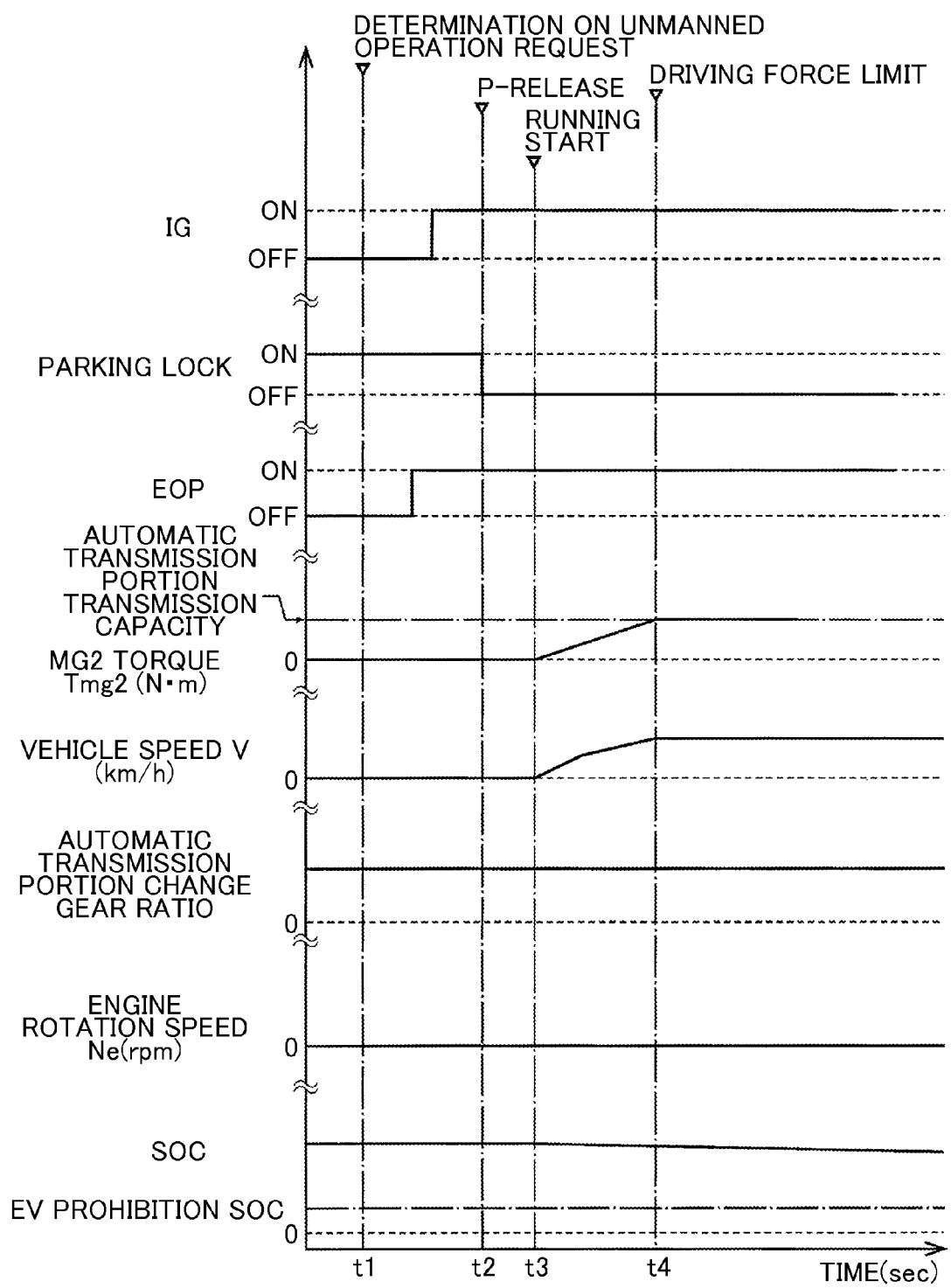
FIG. 11 is a time chart corresponding to the control operation in FIG. 10.

FIG. 10 is a flowchart to describe an essential part of a control operation of the HV-ECU 10, that is, a control operation for performing an engine output restraining control at the time of an unmanned operation in an automatic operation or a remote operation. Further, FIG. 11 is a time chart corresponding to the control operation in FIG. 10.

In FIG. 10, first, in step S1 (hereinafter "step" is omitted) corresponding to the unmanned operation determination device 82, on condition that an automatic operation or a remote operation is performed, it is determined whether the automatic operation or the remote operation is an unmanned operation or not (at a time point t1 in FIG. 11). When the determination in S1 is YES, it is determined whether or not a charging state of the power storage device 43 is larger than a predetermined first remaining charge amount $C_1$, in S2 corresponding to the charging state determination device 84. When either the determination of S2 or the determination of S1 is NO, S6 (described later) corresponding to the hybrid control device 92 is performed. When the determination in S2 is YES, an engine upper limit rotation speed Nemax, which is an upper limit of an engine rotation speed Ne during execution of an engine output restraining control, is set to zero, for example, based on the charging state of the power storage device 43, in S3 corresponding to the engine-output upper limit setting device 86. Then, in S4 corresponding to the driving force range setting device 88, a driving force Fcmg output from the second motor MG2 and the first motor MG1 during the engine output restraining control is set so that an automatic transmission portion input torque $T_{IN}$ does not exceed a transmission torque capacity of the hydraulic frictional engagement devices of the automatic transmission portion 40. Subsequently, in S5 corresponding to the gear shift prohibition device 90, a gear stage of the automatic transmission portion 40 during forward running is set to any one of the first to fourth gears, so that gear shifting to another gear stage from the gear stage thus set is prohibited during the engine output restraining control. When the determination in S1 or S2 is NO, that setting for manned running in which the engine 28, the first motor MG1, and the second motor MG2 are operated so as to maximize fuel efficiency of the engine 28 is selected in S6 corresponding to the hybrid control device 92. Accordingly, in S7 corresponding to the hybrid control device 92, the engine 28, the first motor MG1, and the second motor MG2 are operated so that the fuel efficiency of the engine 28 becomes maximal. In the meantime, when the determinations in S1 and S2 are YES, an engine operation control in which an engine output is restrained is performed in S7. That is, first, in order to secure an engaging pressure to the hydraulic frictional engagement device of the clutch C1 provided in the automatic transmission portion 40, at the time of execution of the engine output restraining control, the electric hydraulic pump 80 is operated, and the ignition is turned on. Then, the parking lock is released via the parking lock control device 94 (at a time point t2 in FIG. 11). Due to the engine upper limit rotation speed Nemax set in S3, the engine stop is maintained after the vehicle starts to run (at a time point t3 in FIG. 11), so that the engine rotation speed Ne becomes zero, for example. Further, within a range of that driving force of the first motor MG1 and the second motor MG2 which is set in S4, an output torque Tmg2 of the second motor MG2 is limited, for example, so as not to exceed the transmission torque capacity that is restrained from increasing as compared with the setting for manned running, due to a decrease of an engine output of the hydraulic frictional engagement device of the automatic transmission portion 40 (after a time point t4 in FIG. 11). Further, after at least the time point t3 in which the vehicle 8 starts to run and the engine output restraining control is performed, the first gear stage is maintained as a gear stage of the automatic transmission portion 40, for example, based on that gear stage of the automatic transmission portion 40 which is set in S5. After execution of S7, this routine is finished.

As described above, according to the HV-ECU 10 of the present embodiment, when it is determined, by the unmanned operation determination device 82, that the unmanned operation is performed and it is determined, by the charging state determination device 84, that the charging state of the power storage device 43 is larger than the first remaining charge amount $C_1$, the output of the engine 28 is limited in comparison with the manned operation, thereby making it possible to reduce a vehicle exterior noise due to the engine 28 in the unmanned operation.

Further, according to the HV-ECU 10 of the present embodiment, when it is determined, by the unmanned operation determination device 82, that the unmanned operation is performed and it is determined, by the charging state determination device 84, that the charging state of the power storage device 43 is larger than the first remaining charge amount $C_1$, the engine 28 is operated within a range of the engine upper limit rotation speed Nemax' set by the engine-output upper limit setting device 86. Accordingly, the engine rotation speed Ne is reduced in comparison with manned running, and the output of the engine 28 is limited, thereby making it possible to reduce a vehicle exterior noise due to the engine 28 during the unmanned operation.

Further, according to the HV-ECU 10 of the present embodiment, the vehicle 8 includes the first motor MG1 and the second motor MG2 as driving force sources in addition to the engine 28, and when it is determined, by the unmanned operation determination device 82, that the unmanned operation is performed, a driving force generated by the differential portion 36 and corresponding to an automatic transmission portion input torque $T_{IN}$ acting on the transmission member 38 serving as an input side of the clutch C1 and the clutch C2 is limited to a region of a driving force that can be generated only by the first motor MG1 and the second motor MG2. This can prevent the output of the engine 28 for generating a driving force that exceeds the region of the driving force that can be generated only by the first motor MG1 and the second motor MG2. Hereby, the output of the engine 28 is limited, thereby making it possible to reduce a vehicle exterior noise due to the engine 28 at the time of unmanned running.

Further, according to the HV-ECU 10 of the present embodiment, the vehicle 8 includes the automatic transmission portion 40, and when it is determined, by the unmanned operation determination device 82, that unmanned running is performed, gear shifting from one gear stage established in the automatic transmission portion 40 to another gear stage is prohibited. Accordingly, it is not necessary to newly design a gear shift map for unmanned running, corresponding to that gear shift map for manned running which is determined based on a vehicle speed V and an output torque Tout of the automatic transmission portion 40, and thus, applicable man-hours of gear shifting during manned running to gear shifting during unmanned running can be reduced.

Further, according to the HV-ECU 10 of the present embodiment, the vehicle 8 includes the automatic transmission portion 40 between the output shaft 42 and the differential portion 36 provided with the first motor MG1 and the second motor MG2, and when it is determined, by the unmanned operation determination device 82, that unmanned running is performed, an output torque of the first motor MG1 and the second motor MG2 is decreased as a hydraulic oil pressure as an engaging pressure supplied to the hydraulic frictional engagement devices of the automatic transmission portion 40 is decreased. Accordingly, a torque acting on the transmission member 38 serving as an input side of the clutch C1 and the clutch C2 is not output beyond the transmission torque capacity of the hydraulic frictional engagement devices that establish a gear stage of the automatic transmission portion 40. This restrains occurrence of clutch slipping in the hydraulic frictional engagement device, and the like.

The present invention has been described in detail with reference to the table and the drawings, but the present invention can be performed with further another embodiment, and various modification can be added thereto without departing from the gist of the present invention.

For example, the driving device 22 included in the vehicle 8 of the above embodiment includes the differential portion 36 provided with two motors of the first motor MG1 and the second motor MG2, and the automatic transmission portion 40, in addition to the engine 28. However, the present invention is not limited to this. For example, in addition to the engine 28, the driving device 22 may include one motor and an automatic transmission, or one motor and a continuously variable transmission (CVT), or one motor and a dual clutch transmission (DCT), and the driving device 22 is configured such that an engine output is restrained in an unmanned operation performed in an automatic operation or a remote operation, in comparison with a manned operation, thereby making it possible to reduce a vehicle exterior noise due to the engine in the unmanned operation. Further, in a case where the driving device 22 includes a continuously variable transmission, if a driving force range of the motor is set according to a decrease in a hydraulic oil pressure supplied to a variable pulley hydraulic actuator of the continuously variable transmission due to restraint of an engine power, slipping of a drive belt wound around variable pulleys can be restrained. Further, when a gear stage (a change gear ratio) of the driving device during an engine output restraining control is fixed, it is possible to reduce man-hours for applying a gear shift map for gear shifting in a setting for manned running in which the engine output restraining control is not performed, to gear shifting at the time of the engine output restraining control performed in the unmanned operation.

Further, the vehicle 8 may be a vehicle including only the engine 28 as a drive source without including the first motor MG1 and the second motor MG2. In this case, in an unmanned operation in a vehicle including the engine 28 and an automatic transmission, an engine output is restrained as compared with a manned operation, thereby making it possible to reduce a vehicle exterior noise due to an operation of the engine.

Further, according to the HV-ECU 10 of the above embodiment, gear shifting from a gear stage set in the automatic transmission portion 40 to another gear stage is prohibited during the engine output restraining control. However, the present invention is not limited to this, and gear shifting may be limited such that gear shifting is performable between the first gear and the second gear, for example. Even in this case, it is possible to reduce man-hours for applying a gear shift setting in the setting for manned running, to gear shifting at the time of an output restraining control.

Further, according to the HV-ECU 10 of the above embodiment, the output of the engine 28 is restrained such that the engine 28 is operated at the engine rotation speed Ne within the range of the engine upper limit rotation speed Nemax' set by the engine-output upper limit setting device 86. However, the present invention is not limited to this. For example, even if an engine output is restrained by reducing an engine load by setting an upper limit of the engine power torque Te that the engine can output during the engine output restraining control, it is possible to reduce a vehicle exterior noise due to the engine 28 in the unmanned operation.

Note that the above embodiment is merely just one embodiment, and other examples are not shown in detail. However, the present invention can be performed in an embodiment to which various changes and improvements are added based on the knowledge of a person skilled in the art without departing the gist thereof.

What is claimed is:

1. A control system for a vehicle, the vehicle including an internal combustion engine, the control system comprising:
a hybrid control computer configured to limit an output of the internal combustion engine when the hybrid control computer determines that the vehicle runs in an unmanned state, such that the output of the internal combustion engine is lower when the vehicle runs in the unmanned state than when the vehicle runs in a manned state, wherein
the vehicle includes an electric motor as a drive source,
the vehicle includes a transmission between the electric motor and an axle,
when the hybrid control computer determines that the vehicle runs in the unmanned state, the hybrid control computer controls an output-shaft rotation speed of the internal combustion engine or a load of the internal combustion engine to be lower when the vehicle runs in the unmanned state than when the vehicle runs in the manned state, and
when the hybrid control computer determines that the vehicle runs in the unmanned state, the hybrid control computer is configured to decrease a torque of the electric motor as a hydraulic oil pressure of the transmission is decreased.

* * * * *